US007812314B1

(12) United States Patent
Smith et al.

(10) Patent No.: US 7,812,314 B1
(45) Date of Patent: Oct. 12, 2010

(54) FLAT PANEL X-RAY DETECTOR WITH REDUCED INTERNAL SCATTERING FOR IMPROVED ATTENUATION ACCURACY AND DYNAMIC RANGE

(75) Inventors: Peter D. Smith, Santa Fe, NM (US); Thomas N. Claytor, White Rock, NM (US); Phillip C. Berry, Albuquerque, NM (US); Charles R. Hills, Los Alamos, NM (US)

(73) Assignee: The United Sttes of America as represented by the United States Department of Energy, Washington, DC (US)

( * ) Notice: Subject to any disclaimer, the term of this patent is extended or adjusted under 35 U.S.C. 154(b) by 324 days.

(21) Appl. No.: 12/040,180

(22) Filed: Feb. 29, 2008

Related U.S. Application Data

(60) Provisional application No. 60/985,692, filed on Nov. 6, 2007.

(51) Int. Cl.
*G01T 1/20* (2006.01)
(52) U.S. Cl. ................................. 250/370.09
(58) Field of Classification Search ............. 250/370.09
See application file for complete search history.

(56) References Cited

U.S. PATENT DOCUMENTS

| | | | |
|---|---|---|---|
| 2,810,837 A * | 10/1957 | Kizaur | 378/188 |
| 5,282,236 A * | 1/1994 | Hayes et al. | 378/182 |
| 6,256,367 B1 | 7/2001 | Vartanian | |
| 6,618,466 B1 | 9/2003 | Ning | |
| 6,744,852 B2 | 6/2004 | Klotz et al. | |
| 7,065,234 B2 | 6/2006 | Du et al. | |
| 7,286,636 B2 * | 10/2007 | Unger et al. | 378/62 |
| 2004/0251438 A1 * | 12/2004 | Iwakiri | 250/591 |
| 2006/0171507 A1 * | 8/2006 | Watanabe et al. | 378/189 |
| 2007/0085015 A1 | 4/2007 | Castleberry | |
| 2007/0165785 A1 * | 7/2007 | Watanabe et al. | 378/189 |
| 2007/0272873 A1 * | 11/2007 | Jadrich et al. | 250/370.11 |
| 2008/0078939 A1 * | 4/2008 | Hennessy et al. | 250/370.09 |
| 2008/0078940 A1 * | 4/2008 | Castleberry et al. | 250/370.09 |
| 2008/0304246 A1 * | 12/2008 | Utschig et al. | 361/818 |

OTHER PUBLICATIONS

Wittenau, "Edge-Spread functions Expected for several Changes in a Commercial Flat-Panel System", LLNL report UCRL-ID-147751. dated Feb. 25, 2002, Livermore, California, USA.

(Continued)

*Primary Examiner*—David P Porta
*Assistant Examiner*—Djura Malevic
(74) *Attorney, Agent, or Firm*—Thomas S. O'Dwyer; James C. Durkis

(57) ABSTRACT

An x-ray detector is disclosed that has had all unnecessary material removed from the x-ray beam path, and all of the remaining material in the beam path made as light and as low in atomic number as possible. The resulting detector is essentially transparent to x-rays and, thus, has greatly reduced internal scatter. The result of this is that x-ray attenuation data measured for the object under examination are much more accurate and have an increased dynamic range. The benefits of this improvement are that beam hardening corrections can be made accurately, that computed tomography reconstructions can be used for quantitative determination of material properties including density and atomic number, and that lower exposures may be possible as a result of the increased dynamic range.

28 Claims, 15 Drawing Sheets

OTHER PUBLICATIONS

Aufderheide et al., "Concluding Report: Quantitative Tomography Simulations and Reconstruction Algorithms", Appendix 1, LLNL report UCRL-ID-146938, dated Feb. 1, 2002, Livermore, California, USA.

LANL Licensable Technolgies Announcement LA-UR-06-1463. "Flat Panel X-Ray Detector with Improved Attenuation Accuracy and Dynamic Range", 2006, Los Alamos, New Mexico, USA, details of invention were not disclosed.

Smith et al., American society of Nondestructive Testing Conference, Nov. 12-16, 2007, Las Vegas, Nevada, USA, abstract for oral presentation that described problem solved by the subject invention, but did not disclose invention.

Smith et al., American society of Nondestructive Testing Conference, Nov. 12-16, 2007, Las Vegas, Nevada, USA, Powerpoint slides for oral presentation that described problem solved by the subject invention, but did not disclose invention. No hardcopies of presentation provided published or distributed to attendees.

* cited by examiner ical Application Ser. No. 60/985,692, filed Nov. 6, 2007, entitled "A Flat Panel X-Ray Detector with Reduced Internal Scattering for Improved Attenuation Accuracy and Dynamic Range" which is incorporated herein by this reference.

FLAT PANEL X-RAY DETECTOR WITH REDUCED INTERNAL SCATTERING FOR IMPROVED ATTENUATION ACCURACY AND DYNAMIC RANGE

CROSS-REFERENCE TO RELATED APPLICATIONS

This application claims the benefit of priority of U.S. Provisional Application Ser. No. 60/985,692, filed Nov. 6, 2007, entitled "A Flat Panel X-Ray Detector with Reduced Internal Scattering for Improved Attenuation Accuracy and Dynamic Range" which is incorporated herein by this reference.

STATEMENT REGARDING FEDERALLY SPONSORED RESEARCH OR DEVELOPMENT

The United States Government has rights in this invention pursuant to Contract No. W-7405-ENG-36 between the United States Department of Energy National Nuclear Security Administration and Los Alamos National Security, LLC for the operation of Los Alamos National Laboratory.

REFERENCE TO A "SEQUENCE LISTING", A TABLE, OR A COMPUTER PROGRAM LISTING APPENDIX SUBMITTED ON COMPACT DISC AND AN INCORPORATION-BY-REFERENCE OF THE MATERIAL ON THE COMPACT DISC

Not Applicable

BACKGROUND OF THE INVENTION

1) Field of the Invention

The present invention relates generally to a flat panel X-ray detector, and particularly to a flat panel X-ray detector having improved attenuation accuracy and dynamic range resulting from reduced internal scattering.

2) Background of the Problem and Description of Related Art Including Information Disclosed Under 37 CFR 1.97 and 37 CFR 1.98

One of the important novel aspects of this invention is our understanding of the cause of a long-standing problem and how the problem can be corrected. Until now, the problem of scattering due to the detector components and the significance of said scattering have only been partially understood, and therefore steps have not been taken to rectify the problem. The result is that inaccurate measurements of X-ray attenuation are unknowingly accepted. If one is concerned only with (qualitative) images, this may be acceptable. However where quantitative information is needed (such as in computed tomography), inaccurate measurements of X-ray attenuation are unacceptable.

In Appendix 1 to LLNL report UCRL-ID-146938, dated Feb. 1, 2002, "Concluding Report: Quantitative Tomography Simulations and Reconstruction Algorithms", Wittenau et al report the results of Monte Carlo simulations of image blur due to scattering from the front and back covers of a detector. In LLNL report UCRL-ID-147751, dated Feb. 25, 2002, "Edge-Spread Functions Expected for Several Changes in a Commercial Flat-Panel System", Wittenau reports the result of Monte Carlo simulations performed to predict the effect on image quality from certain modifications (thinner housing, decreased air gap, etc.). Neither of these reports is based on actual data, and the improvements described therein were never implemented, to the best of our knowledge. Even if they had been implemented, the improvements described therein are not same as the improvements of this invention, nor would they achieve the same quality of results.

In the following, background information is given on (1) the basics of flat panel detectors, the modification of which is the subject of this invention, and (2) the problem that the invention is designed to solve, namely, to measure attenuations accurately and perform beam hardening corrections, and (3) data which show that the cause of the problem is scatter interior to the flat panel detector, (4) how that scatter can be greatly reduced by modifying the flat panel detector, and (5) the benefits of the improved flat panel detector design described herein.

1. The Basics of Flat Panel Detectors

Flat panel x-ray detectors (herein called "FPDs") are used to create a digital x-ray image of an object to be examined (herein called the "object") that is placed between an x-ray source and the FPD. There are several existing FPD designs. A common variety, termed an indirect x-ray detector, is based on a 2-D amorphous silicon or CMOS light detector array in contact with a scintillator. The scintillator converts a spatially varying x-ray intensity behind the object to a spatially varying light intensity, which results in an image of the object. The light image is detected by a array of photodiodes imprinted on the amorphous silicon or the CMOS array. The photodiodes convert the light to an array of electrical signals that are processed to form a digital image. Other FPD designs may utilize direct conversion of x-rays to electrical signals, for example, through amorphous selenium arrays.

Regardless of the method of generating the digital x-ray images, the digital x-ray detector components are typically assembled with other components that may include a housing, protective covers, supports for the detector glass, electronic circuit boards, cooling components, and shielding. Existing FPDs usually have some of these components located in front of or behind the detector array, in the path of the x-rays that penetrate the object. For example, many FPD designs place the electronic components and shielding behind the detector components to make the assembly more compact. Many FPD designs use sheets of aluminum, plastics, and/or carbon fiber composites, placed close to and parallel to the detector array, for various purposes. These purposes include structural support of the detector glass, dust covers, electrical shielding, and structural function of the housing. The components situated in the path of the x-ray beam cause both qualitative and quantitative imperfections in the digital x-ray image. These imperfections may or may not be important, depending on the application of the image, as discussed below.

In addition to digital radiography (DR), that is, capturing individual digital x-ray images for the examination of an object, flat panel detectors are commonly used to acquire data sets used for x-ray computed tomography (CT). In CT, a multitude of DR images are acquired at different angles of view. This can be done by rotating an object that is placed between a stationary source and detector (a typical industrial application) or rotating the source and detector around a stationary object (a typical medical application). More commonly in the medical application, a helical scan is performed by translating the object (the patient) along the axis of a circle, on which the source and detector are rotated. Regardless of the configuration used to acquire the CT data, the multitude of x-ray images are converted to attenuation images and then processed by a computer, using a procedure known as a reconstruction algorithm, to create a 3-D image of the attenuation coefficient inside the object. Since, with a given x-ray beam energy, the attenuation coefficient is related to the density of a material and its atomic number, the reconstruction gives an indication of the density or material variation in the object. An advantage of CT over DR is that the components of the object, such as bones and flesh, may be seen separately, either in cross sections or as 3-D images, rather than overlapping in a 2-D projection image. Another advantage of CT is that the contrast between components of the object is enhanced.

2. The Problem Solved by this Invention

Reconstructed 3-D CT images are more sensitive than the original DR images to imperfections in the numerical values measured by the flat panel detector. Such imperfections may appear as minor variations of image intensity in a DR image, but these variations are magnified, sometimes to cause significant artifacts or distortions, in the reconstructed CT image.

An example of an artifact that is important to CT but not so important to DR is an artifact caused by "beam hardening." Beam hardening is, in essence, the change of spectrum of a polychromatic x-ray beam as the beam penetrates the object. Usually the low energy components of the x-ray spectrum are preferentially absorbed near the surface of the object, so the beam becomes higher in average energy, hence "harder" as it penetrates the object.

In the absence of beam hardening, total attenuation through an object consisting of a single solid material should theoretically be a linear function of thickness, as shown by the line $A_{th}$ in FIG. 1. Beam hardening causes the experimentally measured attenuation to be a nonlinear function of thickness, as shown by the curved line $A_{exp}$ in FIG. 1.

Most CT reconstruction algorithms do not directly take beam hardening into account. As a result, in a CT reconstruction that does not correct for beam hardening, an object of uniform density will appear to be more absorbing to x-rays, hence more dense, on its outer surface than in the interior. This is the well-known "cupping artifact," examples of which are shown below in FIG. 2 and FIG. 3 using simulated and real data, respectively. In both cases the CT object was a circular cylinder, and the graphs are plots of attenuation coefficient measured across the diameter of the cylinder. Other manifestations of beam hardening include streak artifacts caused by shadowing.

There are a variety of methods to correct for beam hardening artifacts in CT reconstructions. The most common method is to calibrate the nonlinear behavior of attenuation vs. thickness (the $A_{exp}$ curve in FIG. 1) using a wedge of the material in question, and to use that calibration curve to modify the measured attenuation images of the object before reconstruction. An example of such a correction is shown in FIG. 2 and FIG. 3 using simulated and real data, respectively, for the same cylindrical objects.

The data used to generate FIG. 2 were calculated using simulations of the x-ray attenuation for a polychromatic beam. The simulation used a known source spectrum, NIST data for the attenuation coefficient of iron for each energy in the spectrum, and the assumption that the x-rays travel in straight lines through the object. The contributions from all energy components are summed to obtain the polychromatic response. These data are perfect and consistent, in that the measurements follow the same theory for both the cylindrical object and the calibration wedge. This makes the wedge correction theoretically exact, as is seen in FIG. 2.

In order for the beam hardening correction to succeed with actual x-ray data rather than simulated x-ray data, it is necessary that the measured attenuations of both the object and of the calibration wedge be accurate and consistent. For this to be true, the measured x-ray data must satisfy the assumption of straight line propagation, which implies that there can be no scattering. Scattering in the object and detector introduces alternative x-ray paths that deviate from the straight line path. As will be shown below, scatter can cause the detector to be illuminated behind an object even though X-rays do not penetrate the object. Scattering distorts the attenuation measurements and causes the beam hardening correction to be inaccurate. FIG. 3 shows an example of a beam hardening correction based on real data obtained from a typical flat panel detector. Even after performing a careful beam hardening correction, there is a significant residual cupping artifact. This underestimation of beam hardening correction is typical of results obtained with flat panel detectors. The errors make it impossible to use existing flat panel CT data for quantitative CT evaluations, such as the measurement of a density profile. Other beam hardening correction methods exist. These might include, for example, a theoretical accounting of attenuation from various physical attenuation mechanisms, considering the source spectrum and the detector response spectrum in detail. U.S. Pat. No. 6,256,367 discloses a method using Monte Carlo simulation to derive corrections for X-ray scatter from the object. This does not address the scatter from detector components, which is the function of this invention. U.S. Pat. No. 7,065,234 discloses a method for beam hardening correction through use of a simulated attenuation curve that includes a known detector response function. Regardless of the method used for beam hardening correction, the method must rely on the assumption that the shape of the attenuation image measured by the detector in the CT scan is reasonably accurate. Errors in the shape of the attenuation image caused by scatter in the detector will result in inaccurate beam hardening correction.

Physical means have been used to correct for scatter. U.S. Pat. No. 6,618,466 discloses use of a bow-tie filter to reduce beam hardening artifacts. The bow tie filter is intended mainly to reduce dose to the patient. It reduces scatter from the object, but it does not address the issue of scatter caused by the components of the detector. U.S. Pat. No. 6,744,852 discloses use of an anti-scatter grid comprised of a high-resistance foam. Anti-scatter grids are intended to solve the problem of scatter from the object, and they do not address scatter caused by components of the detector. Published U.S. Patent Application 2007/0085015 discloses a detector housing comprised of graphite fiber-epoxy composite. Although a housing of solid sheet carbon fiber composite (CFC) could have lower scatter than an aluminum housing, our experimental data show that significant scatter would still result because of the thickness and density of the solid sheets of CFC. Application 2007/0085015 also suggests the inclusion of X-ray absorbing material behind the detector plane. This would be a significant source of backscatter, and that suggestion indicates a lack of appreciation of the need for transparency throughout the detector. There is still a need for a truly transparent housing on the both front and the back of the detector and reduced x-ray absorption from all components internal to the detector in order to solve the detector scatter problem.

3. Data which Show the Cause of the Problem

The fact that scatter adversely affects the attenuation measurements and that the flat panel detector can be the primary and most significant source of the scatter is demonstrated in the following section.

FIG. 4 shows two different attenuation measurements made on the same copper wedge object, under identical x-ray exposure conditions, using the same flat panel detector for the measurements. The wedge measures 4 in. long×2 in. wide, with a thickness at the base of 2 in. (50.8 mm). The exposure was at 420 kV, with a 2.18 mm copper pre-filter. The only difference between the two measurements is the extent of the area of the FPD that was exposed to x-rays. One measurement was done with the x-ray beam shaped to the full size of the active detector area of the FPD. The background exposure of the FPD produced a significant scatter signal behind the wedge. The second measurement was made using a highly collimated pencil beam, for which there is very small scatter in the FPD, and scanning the object through the pencil beam.

At a wedge thickness of 25 mm, the two attenuation curves in FIG. 4 have a ratio of around 4.3/1.8=2.39. This means that the transmitted x-ray signal behind the wedge have a ratio of exp(2.39)=11 between the two curves. An 11/1 signal ratio means that 91% of the signal behind the uncollimated wedge was scatter, and only 9% was direct transmission through the wedge. Obviously, scatter has a large effect on attenuation measurements for highly attenuating objects.

Another demonstration of the scatter is seen in a radiograph of a two-inch thick lead brick, through which there should be negligible transmission signal at 450 kV. FIG. 5 shows the measured edge profile of X-ray signal across the edge of the brick. FIG. 5 shows that the scatter signal behind the brick is around 400 out of 4095, or 10% of the unattenuated signal near the edge, and decays over a long distance. The false signal near the edge corresponds to a false attenuation measurement of around ln(4095/400)=2.32. About 1 inch in from the edge, the false attenuation is around ln(4095/200)= 3.01. In the absence of scattering, the signal behind the lead brick should be near zero, and the attenuations should be very large. These large errors in attenuation, caused by scatter, explain the large difference between the two attenuation curves for the copper wedge in FIG. 4.

Further insight into the cause of the problem is gained by observing that the scatter curve in FIG. 5 is nearly up-down symmetric. This means that the scatter is not forward scatter from the object. If it were, there would be a tail outside the lead brick but zero signal behind the lead brick. The only way for photons to scatter to locations behind the lead brick is for the scatter source to be located behind the lead brick.

The reason for the symmetrical tails is illustrated in FIG. 6. In the absence of the lead brick, the detector plane is bathed in a uniform field of direct x-ray impingement and scatter. FIG. 6 shows the scatter to be backscatter, coming from an aluminum plate behind the detector plane that is representative of an aluminum housing. This is a schematic of one of the MCNP photon transport models that we developed to study this effect. [MCNP is a Monte Carlo (probabilistic) particle transport code developed at Los Alamos National Laboratory. Particles that may be tracked as they travel through an object include, among others, neutrons and x-ray photons. Particle interactions with matter are modeled using probabilistic particle cross section libraries. MCNP can be used both for ray tracing and scatter calculations.] The symmetric scatter tail would also occur with forward scatter from FPD components in front of the detector plane. Regardless of the direction of scatter, the insertion of the lead brick into the x-ray field shadows the direct x-ray field on the detector, hence the source of the scatter in the detector. Scatter coming from the fully exposed part of the FPD shines on the detector behind the brick. Lack of a direct scatter source behind the brick reduces the signal outside the brick in the same way. The effect is symmetrical. At the edge of the brick the scatter signal is half the value it is for the fully exposed FPD without the brick. If the magnitude of the tail is 10%, the level of scatter in the fully exposed FPD is 20%. Thus, a truly significant fraction of this FPD's reading in the unattenuated background region, and also behind objects, is scatter.

4. Data that Demonstrate the Method to Fix the Problem

We have performed several studies with simulation and laboratory experiments which demonstrate that most of the scatter in our CT images is coming from components of the FPD itself. In particular, We have used the MCNP photon transport code to show that the scatter from the room, especially the back wall, is orders of magnitude lower than the scatter from the aluminum housing of the detector.

We removed the aluminum housing from the front and back of the detector plane in an old FPD and found that the scatter tails shown in FIG. 5 were reduced by a factor of two or three, depending on x-ray energy.

We have selectively added and removed materials, such as solid, dense CFC panels of the type normally used on FPDs, from the front and back of the detector glass, demonstrating that scatter signal from these materials is both significant and occurs about equally in the forward and backward direction.

We have inserted light weight CFC-foam sandwich structures in the beam path and found that their effect on the scatter tails is negligible, validating this choice of a transparent material.

Some existing detectors, including the one we used for our experiments, have an aluminum plate that supports the detector glass. We believe that this last aluminum component, which we could not remove, is responsible for most of the remaining scatter that we observed after removing the housing. This is based on our knowledge that the scatter occurs nearly isotropically over a wide angle and is not significantly reduced by the proximity of the glass support to the glass.

Alternative solutions exist to the FPD scattering problem. A linear array of collimated point detectors gives excellent, low-scatter results. This solution is rejected for our applications because data acquisition with a linear array is very much slower and less convenient than with a flat panel area detector. The purpose of this invention is to take advantage of speed and convenience a flat panel area detector yet improve its design so that its images will be of higher quality.

5. The Benefits of the Improved FPD Design

The benefits of the improved FPD design are as follows:

The long distance blurring of the DR images will be eliminated. Fine details will be seen more easily.

The quantitative attenuation values of the images will be much closer to correct, so the images can be used for quantitative DR and CT studies.

It will be possible to make more accurate corrections for beam hardening, especially with highly attenuating objects. This will improve image quality of CT reconstructions.

The dynamic range of the detector will be increased by reducing the background error. Satisfactory x-ray images could be obtained with lower exposures, or alternatively the signal to noise ratio could be increased.

In view of the above, patients may receive lower dose in diagnostic x-ray imaging.

BRIEF SUMMARY OF THE INVENTION

Our solution to the attenuation accuracy/scatter problem is to reduce FPD scatter significantly by eliminating or moving most of the structures in the beam path or replacing them with components that have the least possible scatter. These structures include the FPD's housing and in its interior components, including electronics. Since scatter and attenuation go hand in hand, and since we have shown that both forward and back scatter are important, this means that the entire FPD, not just its front surfaces, should be as transparent as possible to x-rays.

The degree of transparency needed (and hence level of acceptable scattering) in a given situation depends on the application (qualitative imaging vs. quantitative analysis). It is clear from our experimental data that, in existing FPDs, which use dense (solid) CFC sheets as front covers, the dense CFC sheets cause significant scatter. This was observed when dense CFC sheets were removed from the beam path, which caused a significant reduction of the scatter tails of the lead brick image (FIG. 5, above). This means that, for the purposes of quantitative analysis and this invention, the dense CFC sheets are not transparent enough. The objective of this invention is to reduce the scatter tails so they are either not observable or as low as reasonably achievable, essentially equivalent to that which can be obtained with no structure in the beam path. For this purpose, the degree of transparency must be well below that which is achievable using conventional dense CFC sheets. We have also observed (as discussed above) that with the CFC-carbon foam low-Z sandwich structure, introducing and removing the low-Z sandwich structure causes a negligible effect on the height of the scatter tails. Thus, the impact of using a highly transparent material, as opposed to a not-quite-transparent material, is shown to be significant.

The objective to design for complete transparency both in front of and behind the detector array is a significant departure from the common practice of FPD manufacturers today, who apparently assume, incorrectly, that the front side facing the x-ray source should be low attenuation material, but materials behind the glass, including glass support, electronics, electrical shielding, and housing, do not matter. Materials behind the detector array matter greatly because the backscatter photons are of low energy, and the scintillator is more sensitive to low energy photons. Some detectors use absorbing materials in back of the detector assembly, perhaps failing to realize that such materials themselves cause scatter.

The attenuation coefficient of a material in a medium energy (<1 MeV) x-ray beam varies according to the following equation:

$$\mu(E) = \left(\frac{K_1}{E^3}\right)\frac{\rho}{A}Z^n + K_2 f_{KN}(E)\frac{\rho}{A}Z,$$

where $\rho$ is the mass density,
Z is the atomic number,
n is a constant$\cong 4$,
A is the atomic weight,
E is photon energy, and
K1 and K2 are constants.

The first term above is the photoelectric effect, and the second term is Compton scattering.

It is clear from the above that the atomic number Z is very important and that Z should be as low as possible. The low energy photons interacting with the structural material via the photoelectric effect have an attenuation coefficient that varies roughly as $Z^3$, considering that $A \cong 2Z$ for low Z materials. The use of low Z materials in the beam path is also integral to the invention.

The structural materials normally used for flat panel detector design are aluminum (Z=13) and carbon (Z=6). Clearly, carbon is the best choice of the two. Carbon fiber epoxy composites (CFCs) are commonly used in aircraft and race car structures where high stiffness is needed, so they make good light weight structural material. Dense CFCs are commonly used in existing panel designs, mostly as the front-facing material to enclose the housing. As discussed above, dense CFC's are not transparent enough.

The best material theoretically possible would be beryllium (Z=4). This is the lowest Z solid material. Beryllium has a high stiffness and low thermal expansion. The drawback to beryllium is that it is toxic and must be handled carefully. Beryllium is included in various embodiments of this invention in case it is desired to fabricate the most transparent FPD that is possible. In certain embodiments, beryllium might be used in combination with carbon wherein thin carbon layer(s) could provide a barrier to exposure to the beryllium. The material actually selected will depend on performance measurements and experience with a particular application. Specifically, for a particular application, experience might first be obtained with a prototype made from light weight carbon structures, as described below, and a determination could then be made as to whether the results are good enough or further optimization of material is warranted.

It is also clear that the attenuation coefficient varies linearly with density, regardless of material, so the structural material should be as light as possible. Regardless of material selected, this leads to the use of sandwich structures with cores of foam, honeycomb, or similar low density material configurations rather than solid structures. These composites have higher ratios of stiffness to weight and strength to weight than solid materials. The use of light weight composite structures in the beam path is integral to the invention. The preferred embodiment of the invention is a low-Z sandwich structure of carbon foam core and thin CFC skins. Other combinations of materials are possible in alternate embodiments.

Another important design principle is the possible need to maintain an electrical shield around the detector array (the glass) and the electronic components. This ensures that electrical noise from outside the FPD (e.g., switching of a linear accelerator) does not contaminate the detector signal. If required, electrical shielding is provided by placing a Faraday cage, or closed conducting surface around the electronic components of the FPD. For reduced scatter, the conducting surface should be thin and contain as few high-Z atoms as possible to serve the shielding function. In preferred embodiments of the invention, shielding is provided by bonding a thin layer of electrically conductive material to one side of the low-Z sandwich structures. The thin conductive layer may comprise foil, mesh, or plating (preferably aluminum). Foil or mesh may be added to the carbon lay-up before it is pressed and cured. Plating may be applied after the lay up is cured. Aluminum is preferably chosen for the shielding function owing to its relatively low Z and good electrical conductivity. A thin layer will ensure minimal attenuation. It may be possible to eliminate this conductive shielding material in an environment that is known to be low in electrical interference and, in so doing, to achieve higher transparency. This is a decision that must be justified and made for each application.

In addition to conductive material on the low-Z sandwich structures, to create a continuous and closed electrical path it may be necessary that other components, which are preferred to be made of carbon or carbon-based plastic, be made electrically conductive. For example, some embodiments of the invention include interface components (preferably plastic) that connect between the metal housing and the conductive layer on the low-Z sandwich structures. In preferred embodiments, these interface components are made conductive, either by plating one surface of the plastic with a thin layer of a conducting material such as aluminum, nickel, or copper, or by bonding a conducting layer of foil or mesh to one surface. In other embodiments, interface components may be electrically conductive by comprising the components of electrically conductive metal or plastic. In addition, to close the final assembly gap, which may be necessary to allow for fabrication tolerances, an electrically conducting gasket may be used. The use of an electrically conductive gasket provides dual functions of mechanical and electrical closure.

Finally, an important design principle is to keep the number of structural layers small. Alternate embodiments of the invention include two, three, and four panels of light-weight composite low-Z sandwich structures. The number of panels selected depends on considerations of assembly and ruggedness that may be different for different applications. For example, the preferred embodiment of the invention, for maximum transparency, has two low-Z sandwich panels that are close to the detector glass, with the conducting surfaces of the low-Z sandwich panels facing out, with the assembly of said low-Z sandwich panels and glass situated between the front and back surfaces of the housing. This configuration may be deemed too delicate for some applications such as field x-ray equipment. If that is the case, it may be decided to add one or two additional low-Z sandwich panels as permanent covers on the front and/or back surfaces of the housing. With these alternative embodiments containing three our four low-Z sandwich panels, the mechanical assembly and electrical conductivity functions are simplified, as only those low-Z sandwich panels that are part of the electrical shielding envelope need be made conductive, and the electrically conducting assembly gasket can be avoided. This simplification is achieved at the expense of reducing the transparency.

In summary, in accordance with the purposes of the present invention, as embodied and broadly described herein, the present invention includes:

1. Moving the printed circuit boards and their cooling systems to the side of the detector components, out of the beam path.
2. Wherever possible, eliminating unnecessary materials in the beam path or combining functions to reduce the amount of material in the beam path.
3. Replacing structural materials in the beam path with materials having a low atomic number (Z) equal or lower than that of carbon. Such materials are herein called "low Z materials." Candidate materials include but are not limited to carbon (Z=6) and beryllium (Z=4). Aluminum structures (Z=13) in the beam path have been replaced with low Z material.
4. Using structures that are as low in area density as possible. There are many possible structural designs to achieve this goal. An example of an attractive structure is a sandwich structure made with thin CFC skins and a core of carbon foam, honeycomb, or similar low density material configuration.
5. In particular, replacing any components in the path of the x-ray beam, including the panel's housing materials, the structure supporting the detector, and intermediate layer structures, if any, with low Z light weight structures.
6. Further reducing scatter by performing geometrical optimizations as necessary, including adjusting the spacing of components, using scattering simulations as a guide.
7. If electrical shielding is needed, electrical continuity is provided by replacing solid metal structures such as aluminum plates with low Z structures having thin conductive material on one side. This conducting material may include foils, meshes, or plating.
8. Understanding that it is undesirable for any components outside the active detector area to interact with the x-ray beam, because that will produce scatter into the detector, collimating the beam so it is kept inside the active detector area.
9. In certain embodiments, replacing some or all of the glass (silicon Z=14) that supports the substrate of the integrated circuit detector material (e.g., amorphous silicon or CMOS) with a low Z material. For example, this can be done by depositing the amorphous silicon on a very thin layer of glass that is not intended to be structural. Then, after cooling, use a suction device to turn over the thin glass sheet and bond a CFC-foam or beryllium structure onto the glass to serve a structural function. The thin glass concept has the potential advantage that the thin glass will be more flexible than the original glass, increasing the resistance of the detector assembly to damage from shock loading.
10. It is noted that carbon-based structures have an advantage in that they have about the same coefficient of thermal expansion as glass, so they reduce thermal expansion issues.

BRIEF DESCRIPTION OF THE SEVERAL VIEWS OF THE DRAWING

FIG. 15A is the conventional detector glass, and FIG. 15B is the thin glass embodiment.

DETAILED DESCRIPTION OF THE INVENTION

In the present invention, X-ray scattering caused by components of the detector, including its enclosure and internal components, has been greatly reduced through a number of innovative features and measures. The use of aluminum and dense CFCs in structural members that intersect the path of the X-ray beam has been eliminated by use of low-Z materials disposed in a sandwich structure. The only metal remaining in the beam path is in the form of thin metal conductive layers attached to the low-Z sandwich structure to provide (if needed) electrical shielding of the detector and electronic components. Electronics and other components have been moved out of the path of the beam to remove items that could contribute to scattering. Placement of these components out of the beam path may occur via placement to the side, elsewhere within the housing, or external to the housing. Aluminum or plastic plates used to support the detector glass in existing detectors have been eliminated in the present invention through the use of low-Z sandwich structures and light weight elastic compliant material (such as foam) placed against the detector assembly (scintillator and detector glass). An alternate embodiment, to reduce the amount of silicon dioxide in the beam path, is the use of a thinner detector glass sheet bonded to a low-Z sandwich structure layer for its structural support. In further embodiments, the X-ray beam is collimated to keep the beam inside the active detector area (region defined by the scintillator area). Aspects of the present invention and various embodiments will now be discussed with reference to the figures. It is to be understood in the context of this invention that "detector glass" includes a photodetector array layer unless otherwise noted. Similarly, the term "scintillator layer" may be understood to be a scintillator sheet separate from the detector glass, or may be a layer that is bonded to said detector glass. It is to be understood in the context of this invention that detector assembly as used herein may comprise "X-ray responsive components" that: (a) directly detect X-rays (e.g. amorphous selenium that interacts with X-rays and generate a current), and (b) indirectly detect X-rays (e.g. scintillator in conjunction with amorphous silicon or CMOS). Where direct detectors or indirect detectors with an integral scintillator (e.g. Cesium Iodide (CsI) grown on the detector glass) are used, the support structures to support the detector assembly may be simpler than those used for indirect detectors where the scintillator is not integral.

Figure 1:
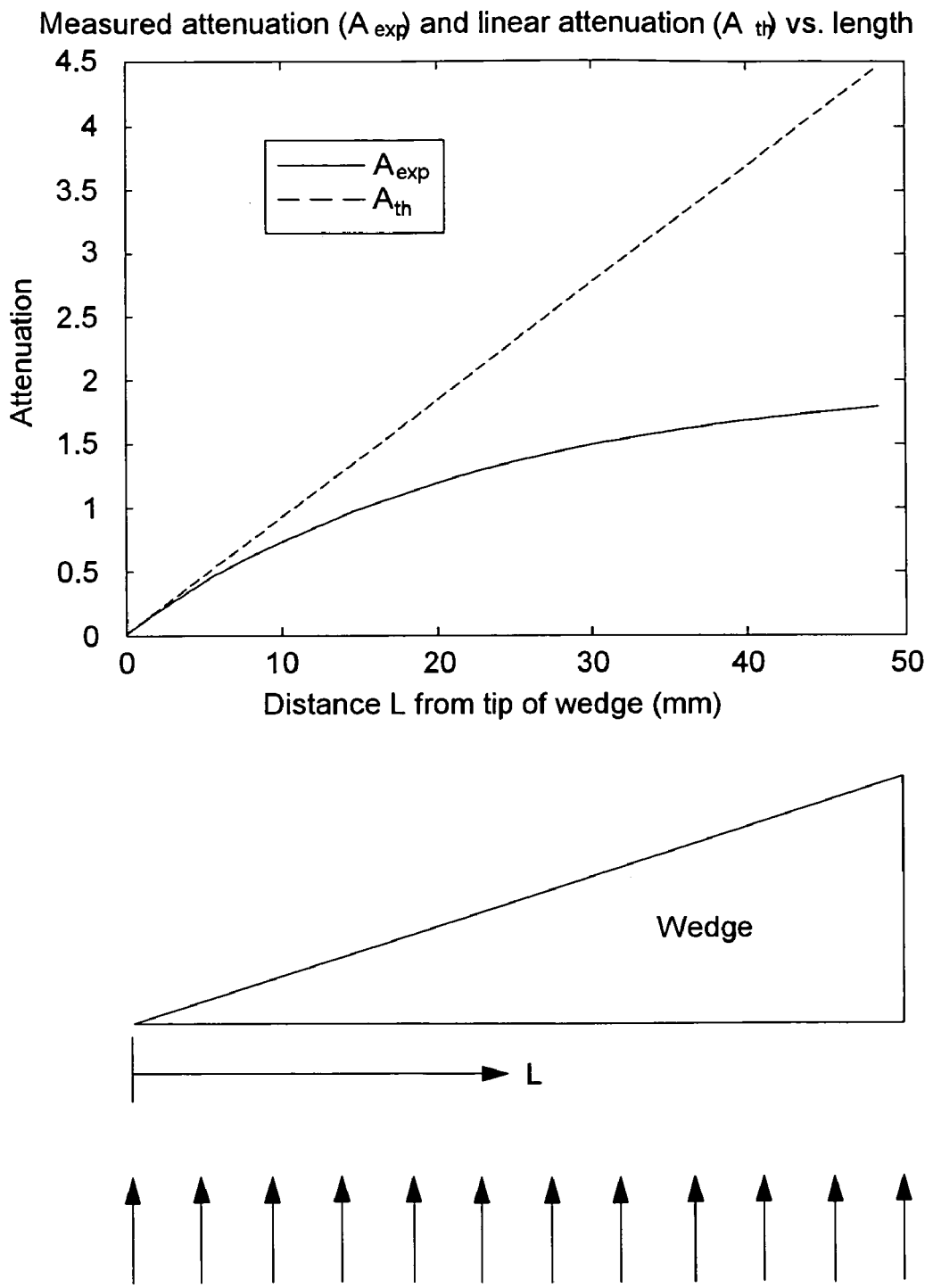
FIG. 1 illustrates how beam hardening is manifested by the fact that the measured attenuation $A_{exp}$ is a nonlinear function of thickness.
Figure 2:
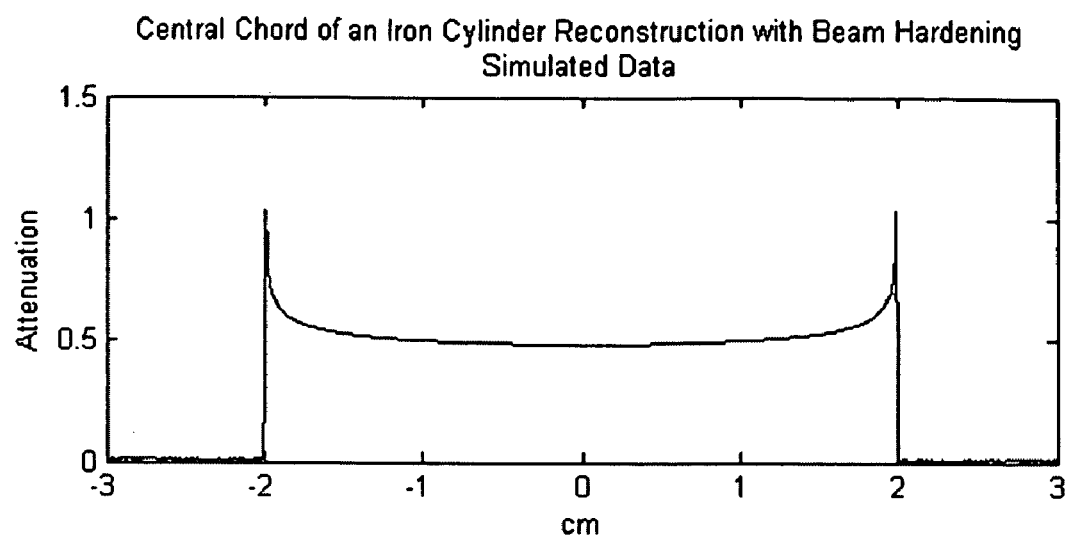
FIG. 2 illustrates a CT reconstruction of an iron cylinder with and without beam hardening correction using simulated x-ray attenuation data. The beam hardening correction is exact using simulated data.
Figure 2:
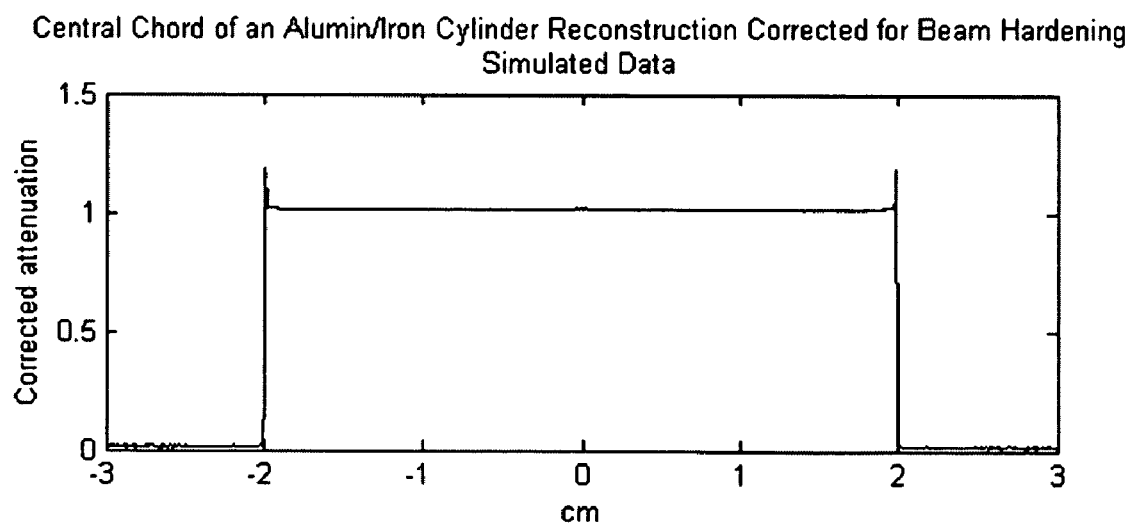
Figure 3:
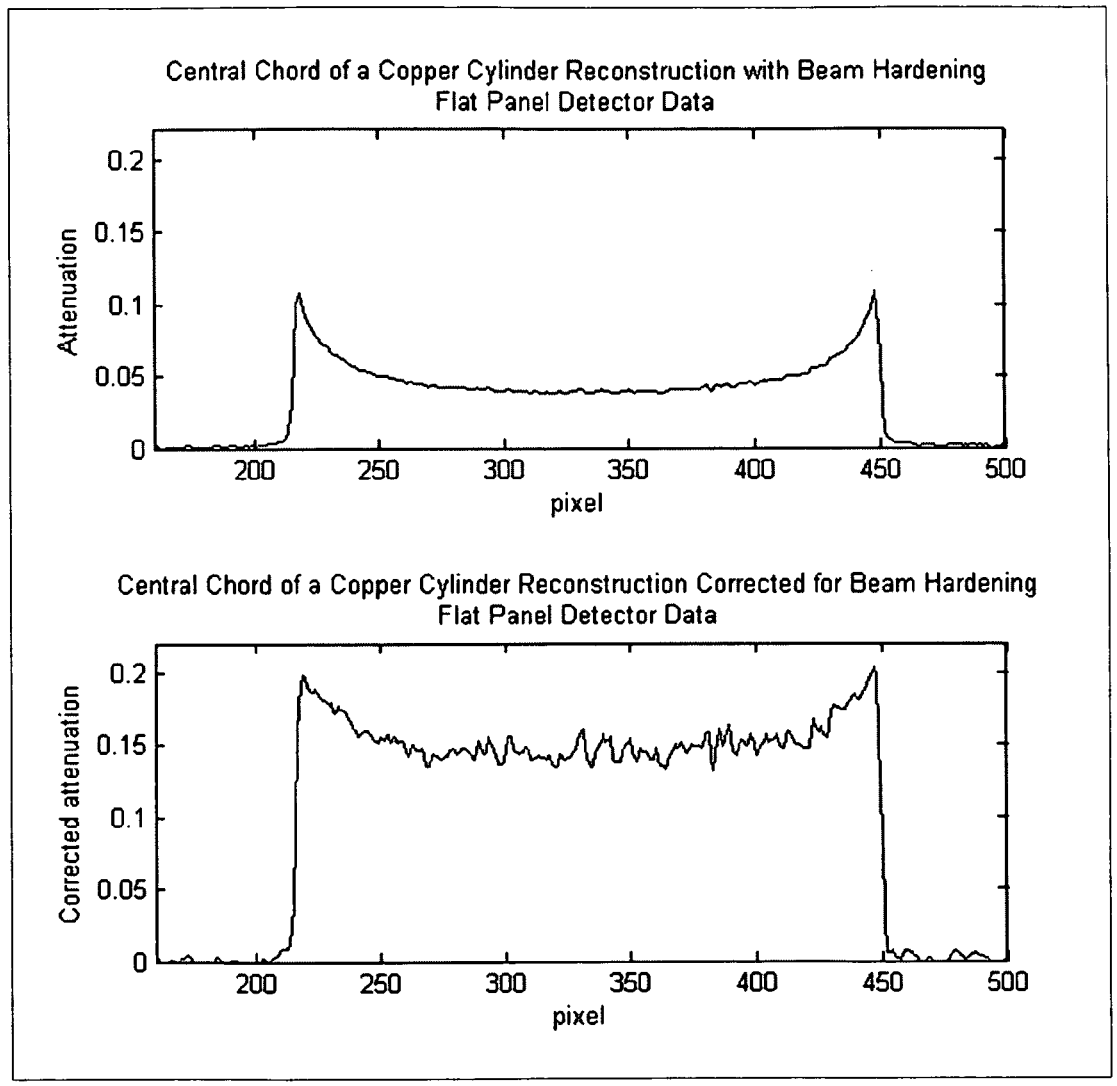
FIG. 3 illustrates the cupping artifact in a copper cylinder and its attempted correction using real FPD data, with X-ray exposure at 420 kV with a 2.18 mm copper pre-filter. The beam hardening correction is inaccurate using real data.
Figure 4:
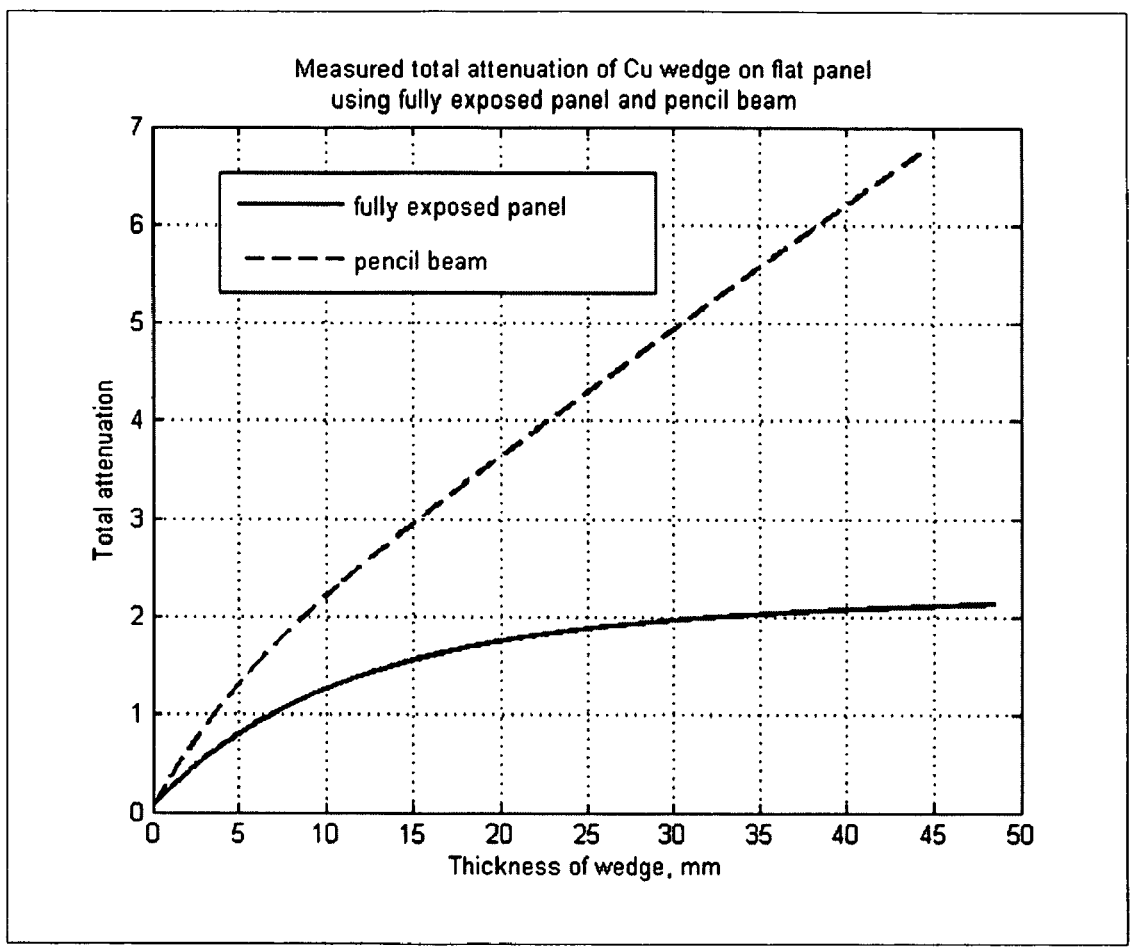
FIG. 4 shows a comparison of copper wedge attenuations measured with a flat panel detector using two x-ray beam configurations: an uncollimated beam with resulting scatter vs. a collimated pencil beam with insignificant scatter. There is a large difference in measured attenuation values.
Figure 5:
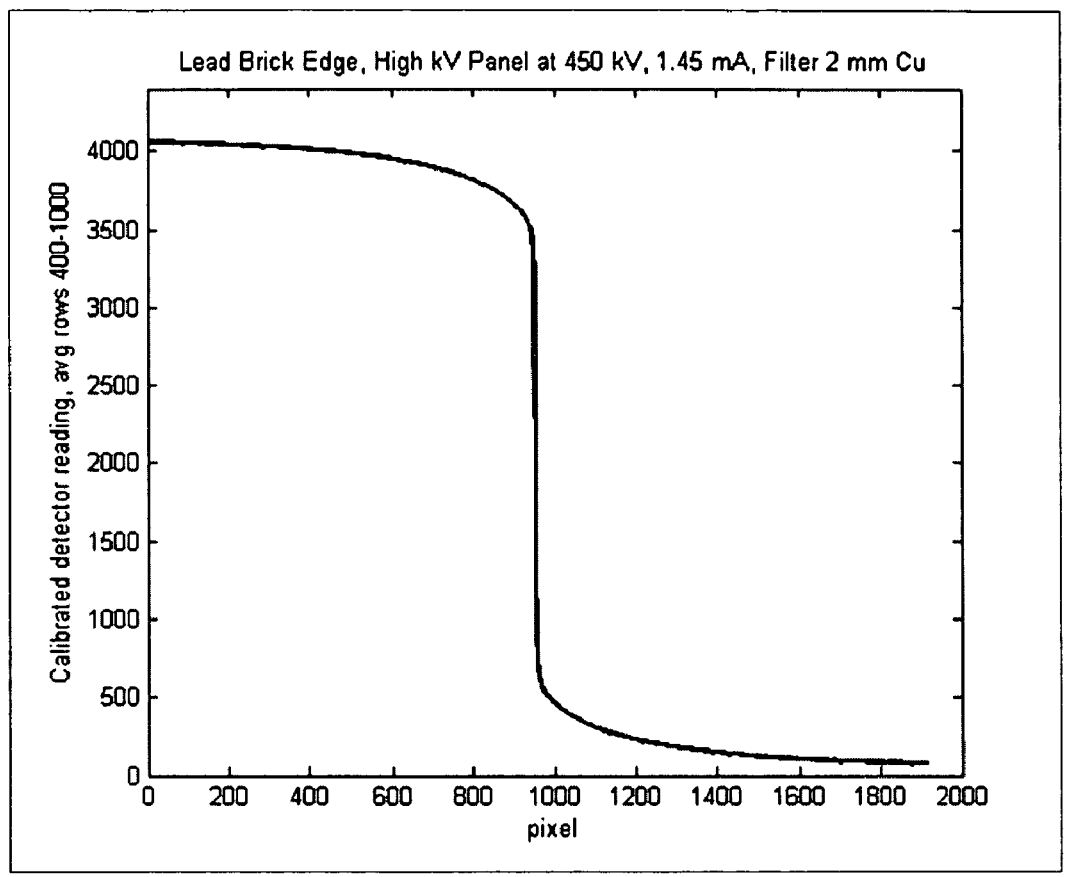
FIG. 5 illustrates X-ray transmission though the edge of a lead brick. The horizontal axis is in pixels of 0.127 mm The significant and long-distance scattering is evident.
Figure 6:
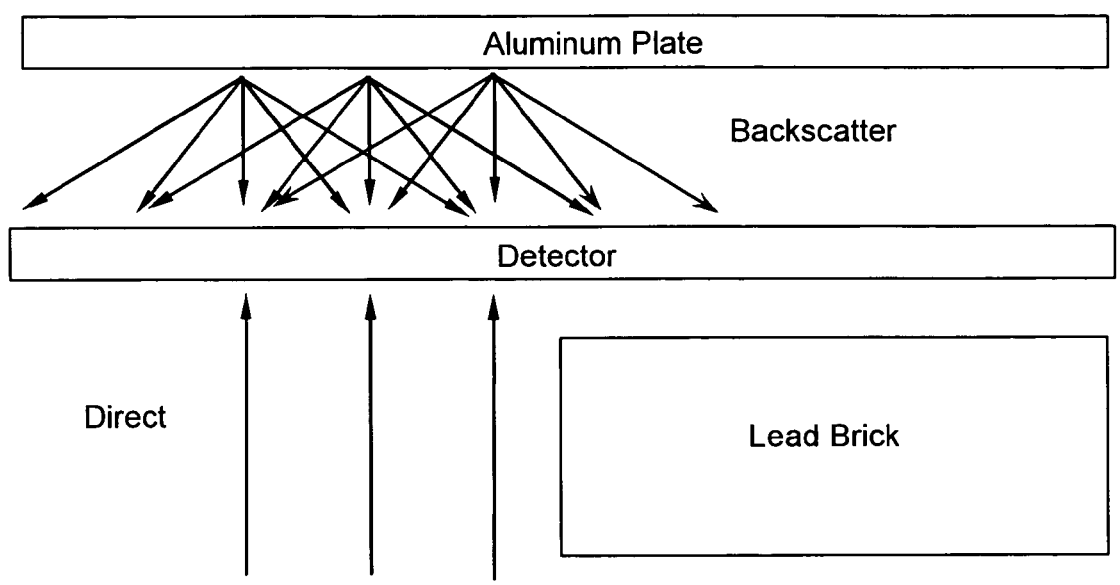
FIG. 6 illustrates the mechanism for symmetrical scatter tails, which, in the case of a lead brick, indicates that the scatter is not coming from the object.
Figure 7A:
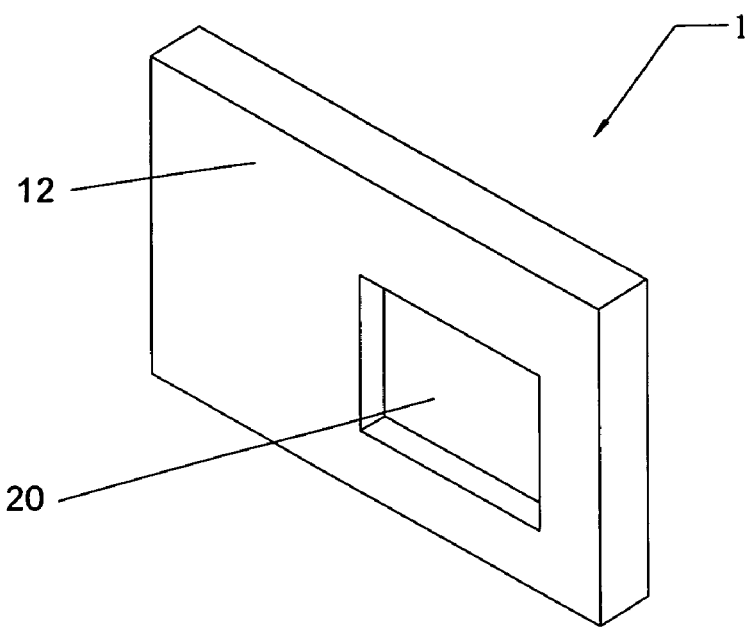
FIGS. 7A and 7B present perspective views for embodiments of the X-ray detector enclosed in a housing.
Figure 7B:
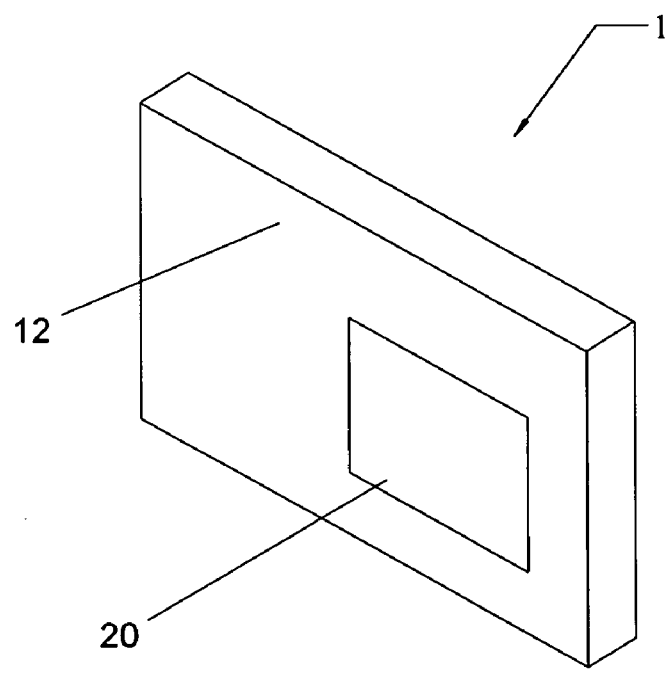

FIG. 7A presents a perspective view of flat panel X-ray detector 1, enclosed in housing 12. X-rays pass through transparent region 20, which in this embodiment is partially inset into housing 12. FIG. 7B presents a perspective view of flat panel X-ray detector 1, enclosed in housing 12. X-rays pass through transparent region 20, which in this embodiment comprises a region on the front cover of housing 12.

Figure 8:
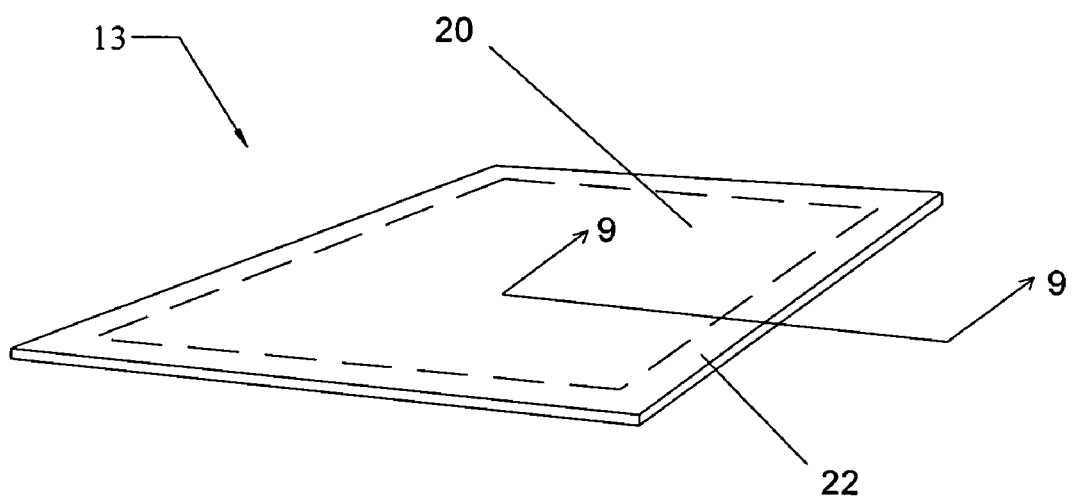
FIG. 8 presents a perspective view a low-Z sandwich structure that is transparent to X-rays.
Figure 9:
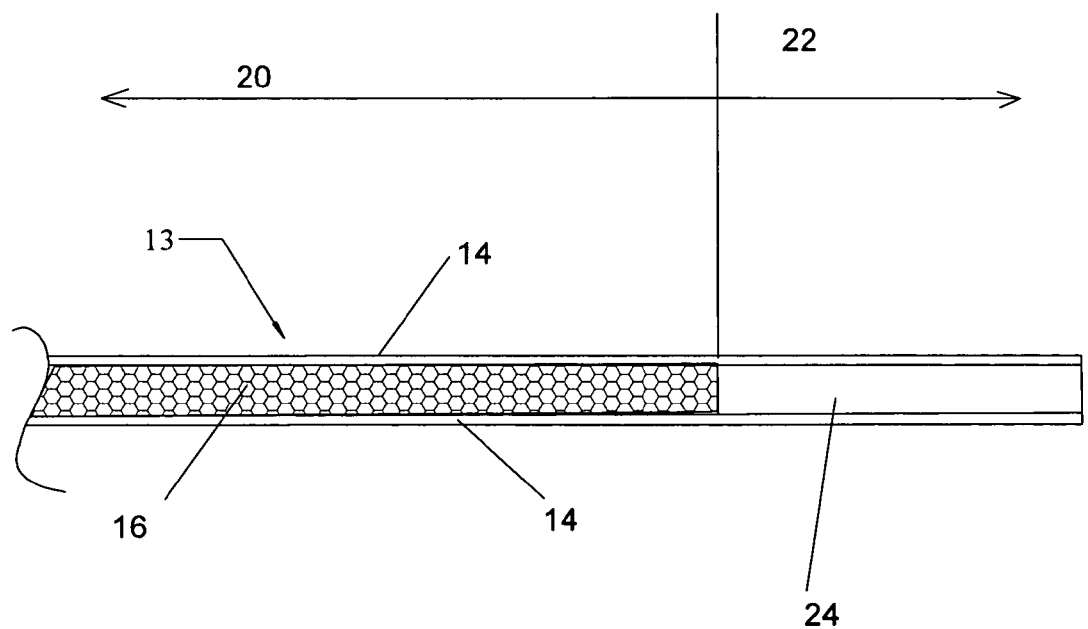
FIG. 9 illustrates an aspect of the present invention with respect to the low-Z sandwich structure which is comprised of skins surround a low density core.

An aspect of the present invention with respect to a low-Z sandwich structure that is transparent to X-rays is described hereunder with reference to FIGS. 8 and 9. FIG. 8 presents a perspective view of low-Z sandwich structure 13, having transparent region 20 surrounded by reinforced perimeter 22. Referring to FIG. 9, low volume density core 16 is overlaid on both sides by skins 14. Core 16 has a foam, honeycomb, or similar low density material structure, and is composed of carbon, beryllium, or combination of the foregoing. In further embodiments, core 16 is a polymethacrylamide foam. Skins 14 are composed of carbon, beryllium, or combination of the foregoing, preferably carbon fiber composite (CFC). In further embodiments, surrounding the perimeter of core 16 (which defines transparent region 20) is perimeter spacer 24 disposed between and bonded to skins 14 which provides a relatively rigid, reinforced perimeter region 22 on the edge of sandwich structure 13 that can withstand compressive loads, such as from clamps or mechanical fasteners (such as screws/nuts). Preferably spacer 24 is made from G10 (fiberglass epoxy plastic) or equivalent rigid plastic material. In further embodiments, low-Z sandwich structure 13 further comprises a thin layer of electrically conductive material (preferably foil, mesh, or plating, and materials preferably being aluminum, copper, or nickel) bonded to one skin 14 to serve as part of an electrical shielding envelope.

Figure 10A:
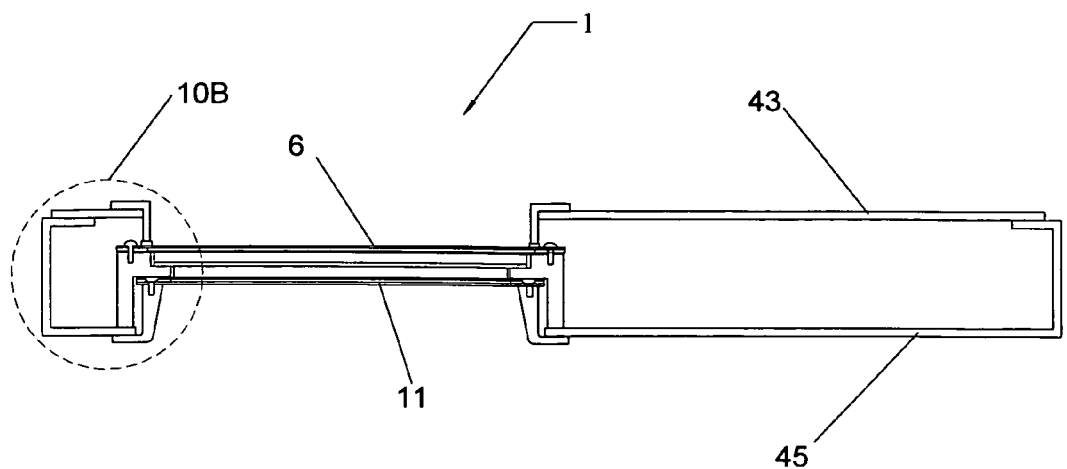
FIGS. 10A and 10B illustrate an embodiment of the present invention entailing the use of two low-Z sandwich structures.
Figure 10B:
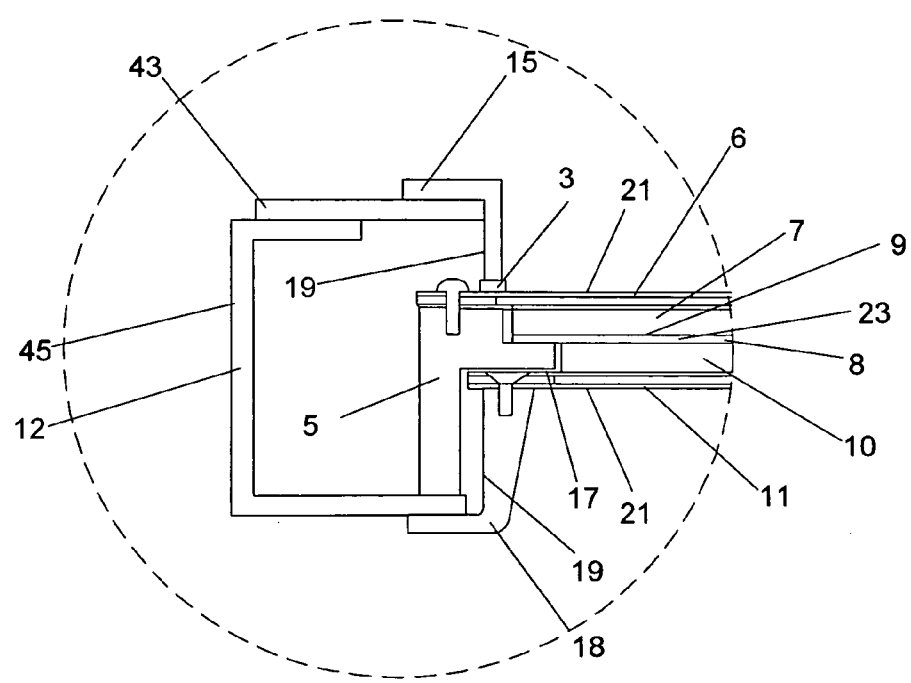

An embodiment according to the present invention is described hereunder with reference to FIGS. 10A and 10B (enlarged view). In various embodiments, the housing 12 for flat panel X-ray detector 1 comprises front cover 43 and back housing 45. Front low-Z sandwich structure 6 and back low-Z sandwich structure 11 surround scintillator 9 and detector glass 8 (having a photodetector array disposed thereon). Disposed between front low-Z sandwich structure 6 and scintillator 9 is front foam 7. If scintillator 9 is bonded to the detector glass 8, front foam 7 would not be needed. If scintillator 9 is separate from the detector glass 8, then front foam 7 serves to press scintillator 9 against detector glass 8. If cushioning of the glass is needed, front foam 7 may be designed to provide this function as well. In further embodiments, disposed between detector glass 8 and back sandwich structure 11 is back foam 10. Back foam 10 serves to balance the pressure loads from front foam 7 and to cushion the back of detector glass 8. Front foam 7 and back foam 10 comprise light weight elastic compliant material (such as foam) that would be used by those with ordinary skill in the art for the purposes described herein. Front interface component 15 connects front sandwich structure 6 to housing 12. Detector assembly 23 (comprising scintillator 9 and detector glass 8) is further connected to housing 12 via glass mount frame 5. In a preferred embodiment, compliant conductive gasket 3 is disposed between front interface component 15 and front sandwich structure 6. Having gasket 3 being electrically conductive and compliant allows one to achieve both mechanical and electrical closure. In other embodiments, compliant conductive gasket 3 may be used with the back interface component 18, or with both front and back interface components. Back interface component 18 connects back sandwich structure 11 to housing 12. A gap, 17, is preferably situated between the detector glass support structure 5 and the back sandwich structure 11 to prevent interference owing to tolerance build-up. In a further embodiment, as shown in FIG. 10B, sandwich structures 6 and 11 further comprise thin layers of electrically conductive material (such as foil, mesh, or plating, and materials preferably being aluminum, copper, or nickel) 21 to provide an electrical connection to front cover 43 and back housing 45 (which are electrically conducting), thereby providing electrical shielding. In this embodiment, interface components 15 and 18 are also made electrically conductive to form a part of the electrical shielding envelope. In preferred embodiments, interface components 15 and 18 are made electrically conductive by having portions of the surface covered with electrically conductive material 19 (preferably foil, mesh or plating, materials preferably being aluminum, copper, or nickel, but other conductive materials may be used,) on rigid plastic. In other embodiments, interface components 15 and 18 are comprised of electrically conductive metal, materials preferably being aluminum, copper, or nickel, or electrically conductive plastic. As shown in the figures, the interface components 15 and 18, and detector glass support structure 5 are shown as three separate components. It should be understood that these components may be combined or configured differently as would be understood by those with ordinary skill in the art, to provide the functions of supporting the detector glass and the sandwich structures. If compliant foam 7 and 10 are not placed between the sandwich structures 6 and 11 and detector assembly 23, it is preferred that there be a gap between sandwich structures 6 and 11, and the detector assembly 23 so that the sandwich structures 6 and 11 don't place undue pressure on detector assembly 23. An exemplary method for assembling the embodiments as discussed above is as follows. Back interface 18 is (preferably mechanically) fastened to housing 12. Back low-Z sandwich structure 11 is (preferably mechanically) fastened to back interface 18. In embodiments where back low-Z sandwich structure 11 has conductive foil, mesh, or plating 21 (preferably aluminum, copper, or nickel) attached, then the conductive side is placed in contact with back interface 18. Glass mount frame 5 is (preferably mechanically) fastened to housing 12. Back foam 10 is placed on back low-Z sandwich structure 11. Detector glass 8 is placed on glass mount frame 5. Scintillator 9 is placed on detector glass 8. Front foam 7 is placed on scintillator 9. Front low-Z sandwich structure 6 is placed on front foam 7 and (preferably mechanically) fastened to glass mount frame 5. This serves to compress foam layers 7 and 10 and seats detector glass 8. Front interface 15 is (preferably mechanically) fastened onto housing 12. Conducting gasket 3 is disposed and compressed between front interface 15 and front low-Z sandwich structure 6. In these embodiments, detector assembly 23 may comprise either direct or indirect detector components. In addition, indirect detector components may comprise either those wherein the scintillator 9 is integral with the detector glass 8, and those wherein the scintillator 9 is not integral (separate) from the detector glass 8.

Figure 11A:
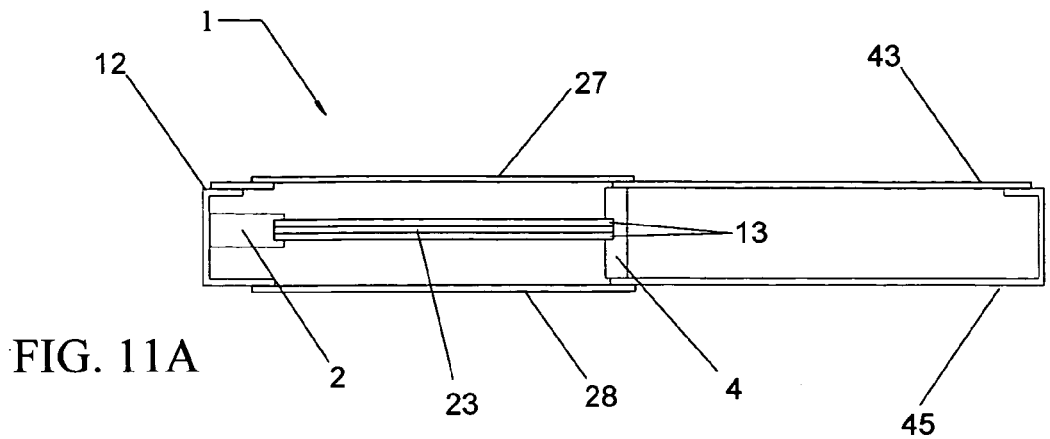
FIGS. 11A-11C illustrate embodiments of the present invention entailing the use of four low-Z sandwich structures and three low-Z sandwich structures.
Figure 11B:
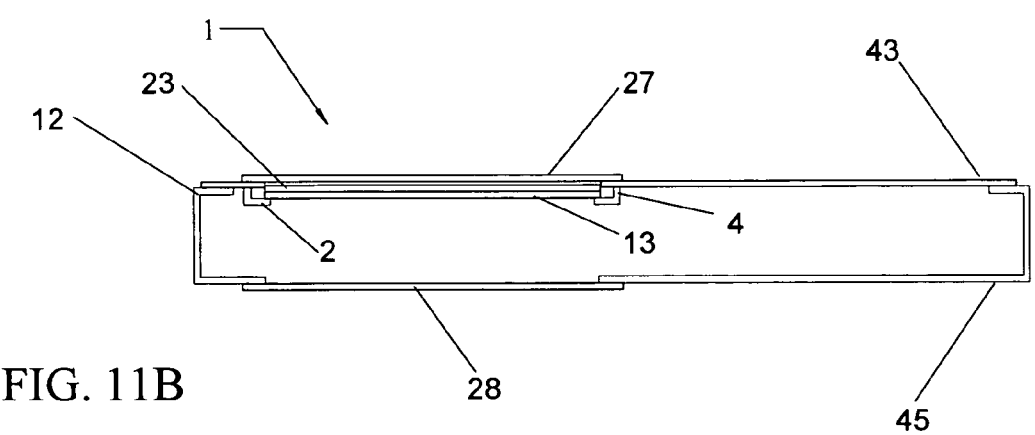
Figure 11C:
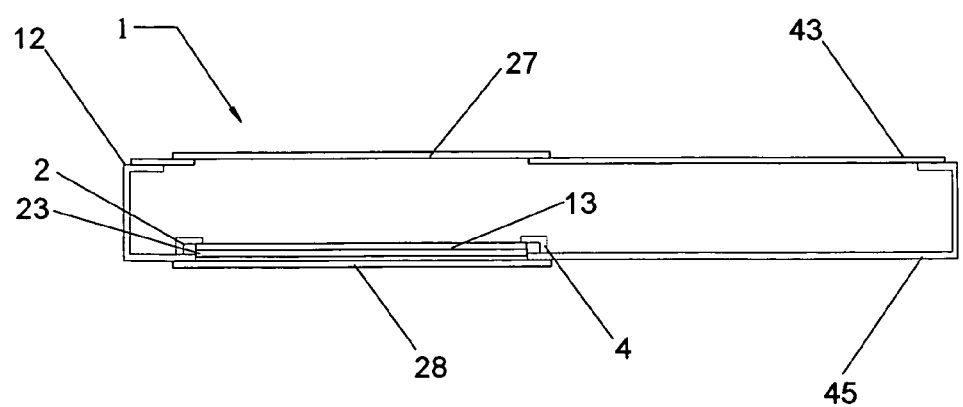

Further embodiments according to the present invention are described hereunder with reference to FIGS. 11A to 11C. In the embodiment shown in FIG. 11A, four low-Z sandwich structures 13 are used, wherein low-Z sandwich structures are used at the front cover 43 and back housing 45 of housing 12, as well as those used with detector assembly 23 (which comprises scintillator and detector glass components described in previous paragraphs). Front low-Z sandwich structure 27 is attached to front cover 43 to close front cover 43. Back low-Z sandwich structure 28 is attached to back housing 45 to close back housing 45. Detector assembly 23 is disposed within and connected to the interior of housing 12 via glass support structures, of which 2 and 4 are schematic examples. It should be understood that those with ordinary skill in the art may employ glass support structures with different configurations that serve the same function. In a preferred embodiment, detector assembly 23 is surrounded on each side by low-Z sandwich structures 13. As shown, low-Z sandwich structures 27, 28 and detector assembly 23 are aligned with the beam path. Electronics and other components (not shown) are disposed within housing 12 out of the beam path. In this embodiment, components that support the detector assembly 23 and sandwich structures 13 may be simpler than those used in the embodiments shown in FIGS. 10A, B, and no conducting gasket is needed which makes assembly simpler. However the presence of the two additional low-Z sandwich structures makes the transparent region less transparent than embodiments with fewer low-Z sandwich structures. Referring to FIGS. 11B and 11C, embodiments are shown wherein three low-Z sandwich structures 13 are used. Referring to FIG. 11B, front low-Z sandwich structure 27 is attached to front cover 43 to close that portion of front cover 43. Detector assembly 23 is disposed interior to and adjacent to (preferably with a gap there between) front low-Z sandwich structure 27. Detector assembly 23 has a low-Z sandwich structure 13 disposed on its side distal from low-Z sandwich structure 27. Detector assembly 23 and sandwich structure 13 may be connected to housing 12 via glass support structures, of which 2 and 4 are schematic examples. It should be understood that those with ordinary skill in the art may employ glass support structures with different configurations that serve the same function. Back low-Z sandwich structure 28 is attached to back housing 45 to close that portion of back housing 45. Referring to FIG. 11C, front low-Z sandwich structure 27 is attached to front cover 43 to close that portion of front cover 43. Back low-Z sandwich structure 28 is attached to back housing 45 to close that portion of back housing 45. Detector assembly 23 is disposed interior to and adjacent to (preferably with a gap there between) back low-Z sandwich structure 28. Detector assembly 23 has a low-Z sandwich structure 13 disposed on its side distal from low-Z sandwich structure 28. Detector assembly 23 and sandwich structure 13 may be connected to housing 12 via glass support structures, of which 2 and 4 are schematic examples. It should be understood that those with ordinary skill in the art may employ glass support structures with different configurations that serve the same function. Relative to the embodiment with four low-Z sandwich structures, these embodiments would be more transparent, but slightly more complex to assemble. Electronics and other components (not shown) are disposed within housing 12 out of the beam path. In these embodiments, detector assembly 23 may comprise either direct or indirect detector components. In addition, indirect detector components may comprise either those wherein the scintillator 9 is integral with the detector glass 8, and those wherein the scintillator 9 is not integral (separate) from the detector glass 8.

Figure 12A:
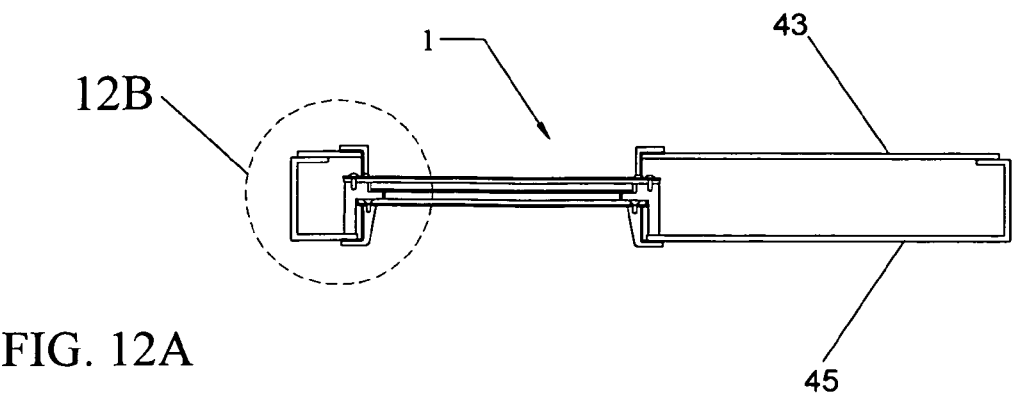
FIGS. 12A-12C illustrate embodiments of the present invention with respect to providing electrical shielding. Here the electrically conductive layers (foil, mesh, or plating) are shown as bolder lines for illustration only.
Figure 12B:
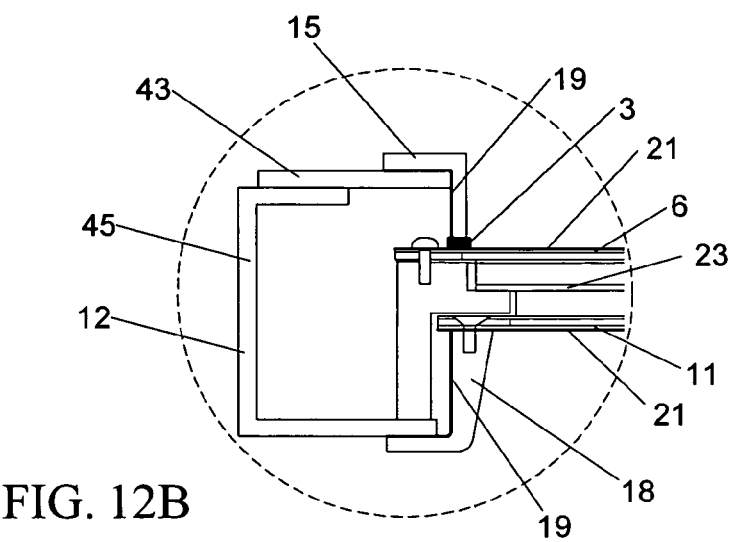
Figure 12C:
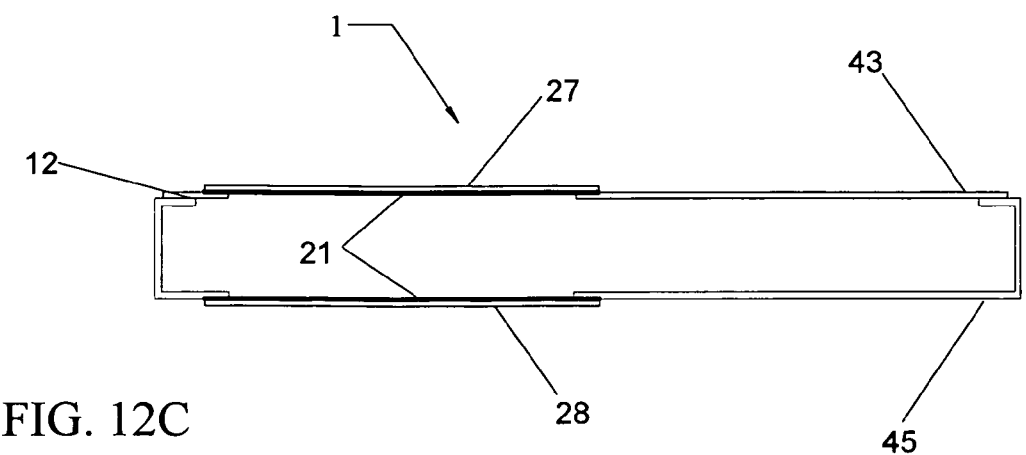

Referring to FIGS. 12A and 12B, a further embodiment to that shown in FIGS. 10A and 10B is presented in which electrical continuity is established to provide a continuous electrical shielding envelope around the detector assembly 23 and the electronic components. Low-Z sandwich structures 6 and 11 further comprise layers of conductive material 21, preferably foil, mesh, or plating, preferably aluminum, on one surface (shown as a thick line for clarity). The interface structures 15 and 18 further comprise conductive material, preferably thin conductive foil, mesh, or plating on one surface. The housing 12 (front cover 43 and back housing 45) are made of electrically conducting material (preferably aluminum, copper, or nickel). In other embodiments, housing 12 may be comprised of non-conducting materials (preferably plastic), and bonded or plated with electrically conductive material. An electrically conducting gasket 3 is provided between one interface structure 15 and the adjacent sandwich structure conductive material 21. On the back side, the electrical path goes from the housing 12 through the conductive material 19 on the back interface structure 18 to the conductive material 21 on the back sandwich structure 11. On the front side, the electrical path goes from the housing 12 to the conductive material 19 on the front interface, through the conducting gasket 3 to the conductive material 21 on the front sandwich structure 6. The position of the conducting gasket 3 may be switched from front to back, depending on the desired order of assembly. Referring to FIG. 12C, a further embodiment to that shown in FIGS. 11A to 11C is presented. Low-Z sandwich structures 27 and 28 further comprise thin layers of conductive material, preferably foil, mesh, or plating 21 (preferably aluminum, copper, or nickel), shown as a thick line for clarity which provide an electrical connection to housing 12 (front cover 43 and back housing 45) which is electrically conducting (preferably aluminum, copper, or nickel), thereby providing electrical shielding. The electrical path goes between the conductive layers on the low-Z components to the back housing 45 and front cover 43, at the contact points between the conductive layers and the metal housing.

Figure 13A:
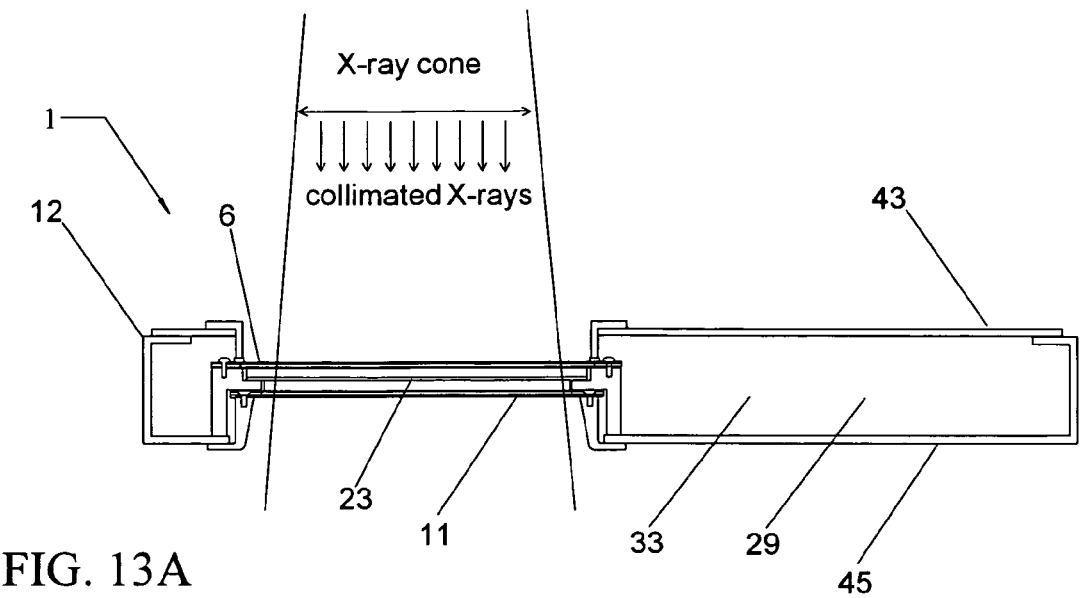
FIGS. 13A and 13B illustrate embodiments of the present invention with respect to collimation of X-rays and placement of electronics outside of the beam path.
Figure 13B:
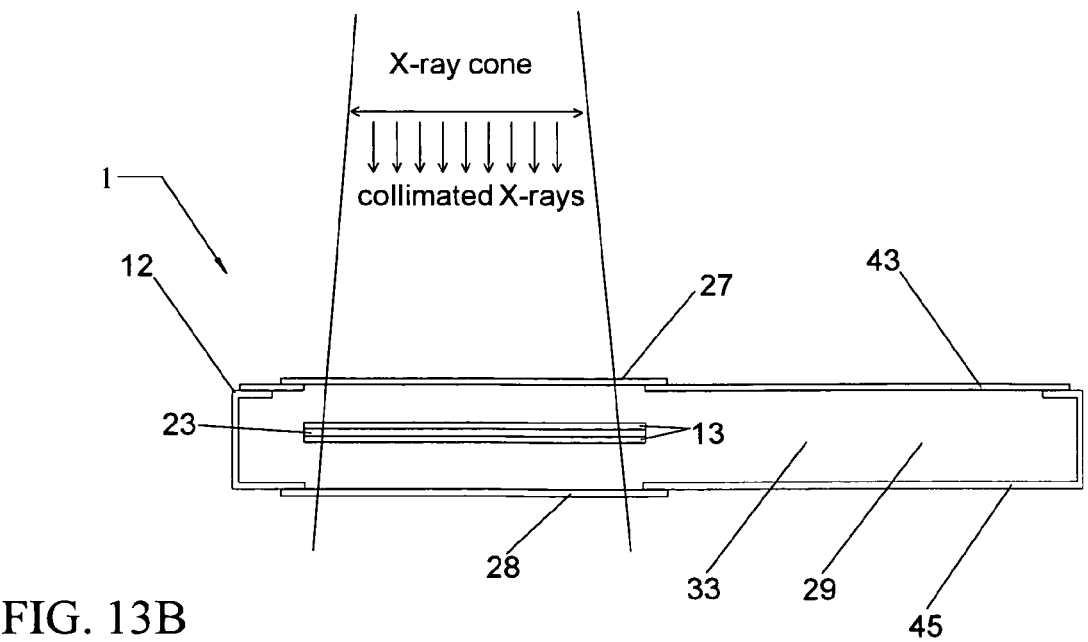

Referring to FIG. 13A, a further embodiment to that shown in FIGS. 10A and 10B is presented wherein the beam of X-rays is collimated so that the beam impinges only on the transparent portion of the low-Z sandwich structures (6 and 11) and the detector assembly 23. Electronic components 29 and shielding 33 that are disposed within housing 12 are placed so as to be out of the beam's path. Referring to FIG. 13B, a further embodiment to those shown in FIGS. 11A to 11C is presented wherein the beam of X-rays is collimated so that the beam impinges only on the low-Z sandwich structures (27, 28 and 13) and detector assembly 23. Electronic components 29 and shielding 33 that are disposed within housing 12 are placed so as to be out of the beam's path.

Figure 14:
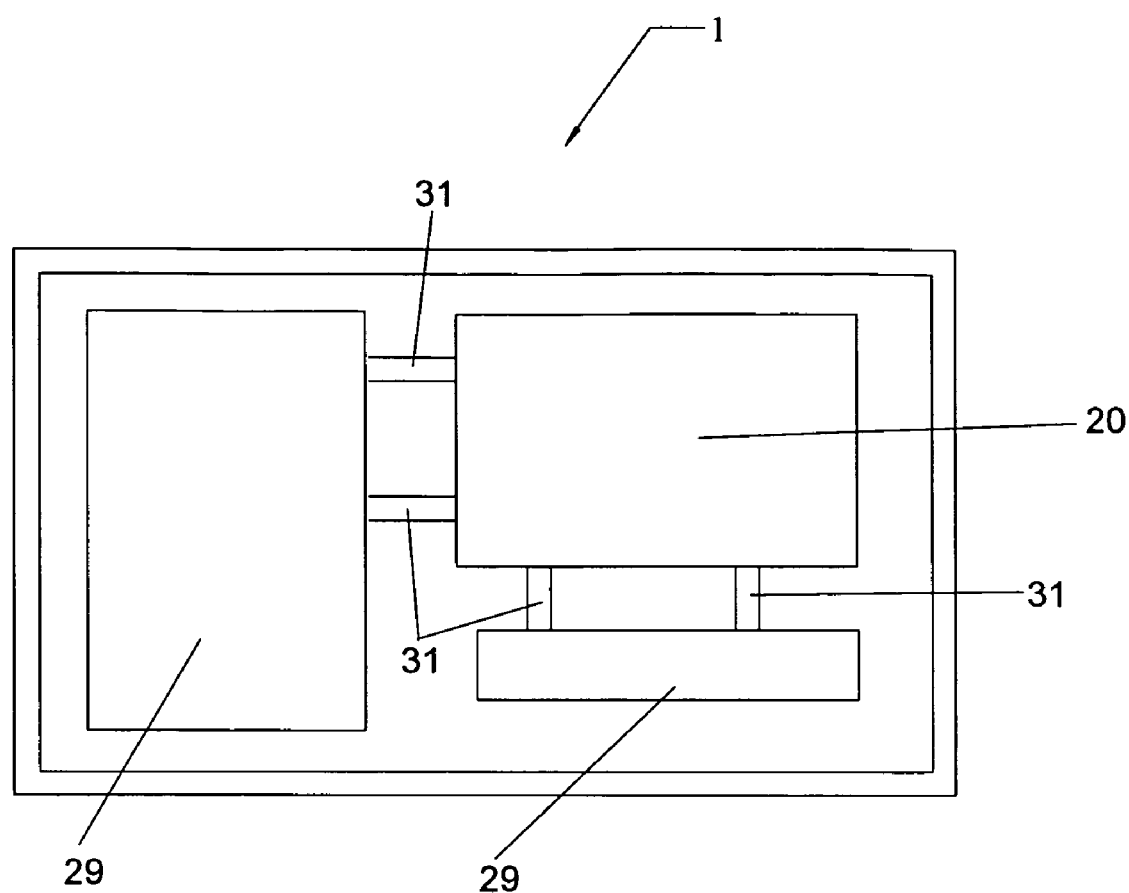
FIG. 14 illustrates an aspect of the present invention with respect to placement of electronics outside of the beam path.

FIG. 14 shows in exemplary fashion how electronics 29 and electrical connections 31 may be placed so as to be out of the path of the X-rays that impinge on transparent area 20.

Figure 15A:
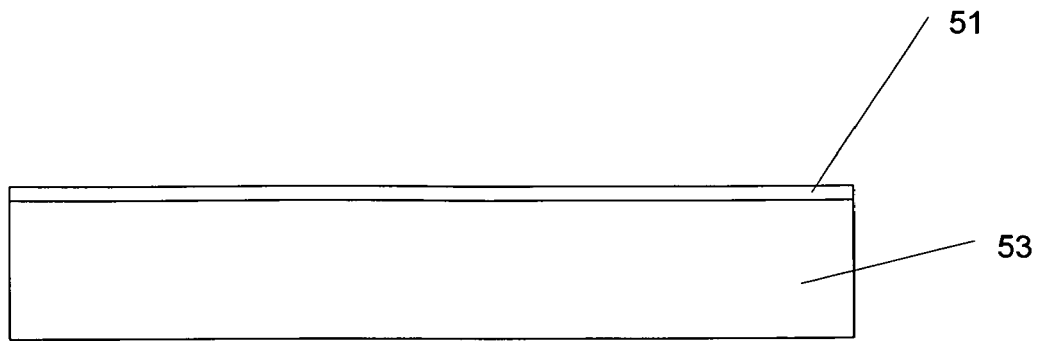
FIGS. 15A and 15B illustrate another embodiment of the present invention with respect to a detector glass whose thickness is reduced and with structural stability provided by a low-Z sandwich structure.
Figure 15B:
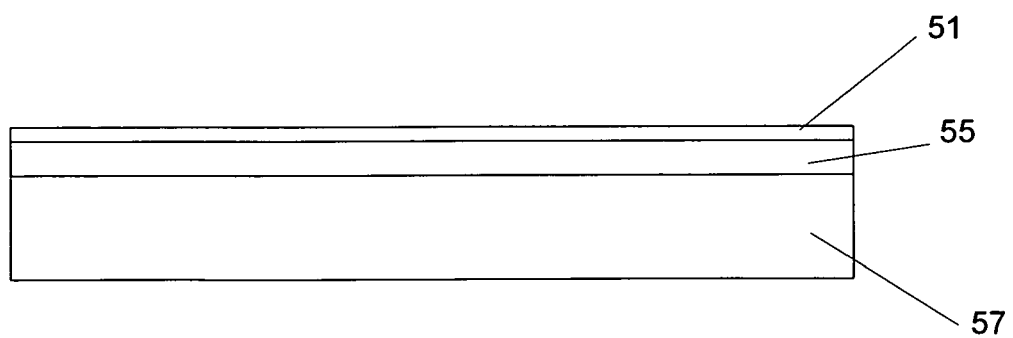

In further embodiments of the present invention, a modified detector glass may be used in lieu of conventional detector glass. Referring to FIG. 15A, conventional detector glass (FIG. 15A) comprises glass layer 53 on which an amorphous silicon layer 51 is deposited. Referring to FIG. 15B, in a modified detector glass, the glass layer 55 has been greatly reduced in thickness compared to glass layer 53. Underlying the glass layer 55 is a low-Z sandwich structure 57 (comprising the two skins sandwiched around a low density rigid core as described earlier minus the rigid perimeter spacer). The reduced thickness glass layer 55 combined with the low-Z sandwich structure 57 will be more transparent than the original glass layer 53. In addition the reduced thickness glass layer 55 is not intended to be structural and therefore will have the potential advantage that this reduced thickness glass will be more flexible than the original glass 51, increasing resistance of the detector assembly to damage from shock loading.

EXAMPLES

A low-Z sandwich structure was used comprising CFC skins each 0.011 inch thick surrounding a 0.060 inch Rohacell (polymethacrylimide) foam core. X-ray scattering measurements were made comparing the performance of the above low-Z sandwich structure to that with a standard aluminum housing, a 0.1 inch thick solid CFC sheet, a 0.060 inch thick solid CFC sheet, and without any housing. Although scattering was reduced through use of the solid CFC sheets as compared to the aluminum housing, the low-Z sandwich structure showed reduced scattering comparable to that with the housing being removed.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A flat panel X-ray detector comprising:
   a housing having an opening through which said X-rays could pass through unimpeded;
   a detector assembly disposed within said opening to receive said X-rays, said detector assembly comprising a detector selected from the list of direct detectors, indirect detectors having a scintillator integral with its detector glass, and indirect detectors having a scintillator that is not integral with its detector glass;
   an X-ray transparent front layer having a low-Z sandwich structure, disposed adjacent to the front side of said detector assembly;
   an X-ray transparent back layer having a low-Z sandwich structure, disposed adjacent to the back side of said detector assembly;
   a front interface member connecting said front sandwich structure to said housing;
   a back interface member connecting said back sandwich structure to said housing;
   a glass mount member connecting said detector assembly to said housing;
   wherein said low-Z sandwich structure comprises two thin skins, a low-volume-density transparent core disposed between said skins, and a rigid member disposed between and bonded to said skins; and
   wherein said rigid member surrounds the perimeter of said transparent core for the purpose of resisting compressive loads.

2. The flat panel X-ray detector according to claim 1 wherein the materials for said skins and core are selected from the list consisting of carbon, beryllium, and combination of the foregoing; and
   wherein the structure for said core is selected from the list consisting of foam, honeycomb, or similar low density material.

3. The flat panel X-ray detector according to claim 1 further comprising:
   a thin layer of electrically conductive material bonded to one of the skin surfaces of said front sandwich layer, with said thin conductive layer in contact with said front interface member;
   a thin layer of electrically conductive material bonded to one of the skin surfaces of said back sandwich layer, with said thin conductive layer in contact with said back interface member;
   an electrically conductive gasket between one interface member and the corresponding sandwich layer;
   wherein said housing is electrically conductive;
   wherein the portions of said front and back interface members that are in contact with said electrically conductive thin layers and said housing are comprised of electrically conductive material; resulting in said electrically conductive thin layers, said interface members and said housing forming an electrically continuous box that electrically shields components within said housing.

4. The flat panel X-ray detector according to claim 3 wherein:
   said thin layers of electrically conductive material comprise foil, mesh, or plating.

5. The flat panel X-ray detector according to claim 3 wherein:
   the electrically conductive portions of said front and back interface members are electrically conductive by means selected from the list consisting of:
   a) said front and back interface members are comprised of electrically conductive material and
   b) said front and back interface members are plastic with electrically conductive material attached comprised of foil, mesh, or plating.

6. The flat panel X-ray detector according to claim 3 wherein:
said thin layers of electrically conductive material is selected from the list of materials consisting of aluminum, copper, and nickel; and
said interface member electrically conductive material is selected from the list of materials consisting of aluminum, copper, and nickel.

7. The flat panel X-ray detector according to claim 1 wherein:
said detector assembly comprises an indirect detector having a scintillator that is not integral with the detector glass; and
further comprising:
at least one layer of lightweight, elastic, compliant foam, wherein the disposition of said foam layer is selected from the list consisting of
a) a layer disposed between said front sandwich layer and said scintillator;
b) a layer disposed between said back sandwich layer and said detector glass;
c) a first layer disposed between said front sandwich layer and said scintillator, and a second layer disposed between said back sandwich layer and said detector glass.

8. The flat panel X-ray detector according to claim 1 wherein:
said core is comprised of a carbon foam;
said skins are comprised of carbon fiber composite; and
said rigid member is comprised of fiberglass epoxy plastic.

9. The flat panel X-ray detector according to claim 1 wherein:
said X-rays are collimated prior to impinging on said scintillator.

10. The flat panel X-ray detector according to claim 1 wherein:
said detector assembly comprises an indirect detector and,
said detector glass is reduced in thickness to give it both greater X-ray transparency and a measure of flexibility compared to conventional detector glass;
and further comprising a low-Z sandwich structure affixed to said thin detector glass for structural support.

11. The flat panel X-ray detector according to claim 1 further comprising:
detector assembly electronics disposed in said housing or outside said housing, wherein said electronics are outside of the path of said X-ray beam.

12. A flat panel X-ray detector comprising:
a housing comprising a front cover and a back housing, said front cover and said back housing each having an opening through which said X-rays could pass through unimpeded;
an X-ray transparent panel having a low-Z sandwich structure attached to said front cover covering said front cover opening;
an X-ray transparent panel having a low-Z sandwich structure attached to said back cover covering said back housing opening;
a detector assembly, having front and back sides, disposed within said housing in line to receive said X-rays, said detector assembly comprising:
a detector selected from the list of direct detectors, indirect detectors having a scintillator integral with its detector glass, and indirect detectors having a scintillator that is not integral with its detector glass;
one or more structural members to connect said detector assembly to said housing;
wherein said detector assembly is disposed with at least one adjacent X-ray transparent layer having a low-Z sandwich structure;
wherein said low-Z sandwich structure comprises two thin skins, a low-volume-density transparent core disposed between said skins, and a rigid member disposed between and bonded to said skins; and
wherein said rigid member surrounds the perimeter of said transparent core for the purpose of resisting compressive loads.

13. The flat panel X-ray detector according to claim 12 wherein:
said detector assembly is disposed adjacent to the inward interior facing surface of said front cover transparent panel, with a back-side X-ray transparent layer disposed adjacent to said back of said detector assembly;.

14. The flat panel X-ray detector according to claim 12 wherein:
said detector assembly is disposed adjacent to the interior facing surface of said back cover transparent panel, with a front-side X-ray transparent layer disposed adjacent to said front of said detector assembly.

15. The flat panel X-ray detector according to claim 12 wherein:
said detector assembly is disposed within the opening of said housing substantially equidistant from said front and back covers, with a front-side X-ray transparent layer disposed adjacent to said front of said detector assembly and a back-side X-ray transparent layer disposed adjacent to said back of said detector assembly.

16. The flat panel X-ray detector according to claim 12 wherein the materials for said skins and core are selected from the list consisting of carbon, beryllium, and combination of the foregoing;
and wherein the structure for said core is selected from the list consisting of foam, honeycomb, or similar low density material.

17. The flat panel X-ray detector according to claim 12 further comprising:
a thin layer of electrically conductive material bonded to said front cover transparent layer, with said thin electrically conductive material being in electrical contact with said housing;
a thin layer of electrically conductive material bonded to said back housing
transparent layer, with said thin electrically conductive material being in electrical contact with said housing;
wherein said housing is electrically conductive; and
wherein said electrically conductive thin layers, and said housing form an electrically continuous box that electrically shield components within said housing.

18. The flat panel X-ray detector according to claim 17 wherein:
said thin layers of electrically conductive material comprise foil, mesh, or plating.

19. The flat panel X-ray detector according to claim 18 wherein:
said electrically conductive material is selected from the list of materials consisting of aluminum, copper, and nickel.

20. The flat panel X-ray detector according to claim 12 wherein:
said detector assembly comprises an indirect detector having a scintillator that is not integral with the detector glass;

and further comprising a layer of lightweight, elastic, compliant foam disposed immediately adjacent to the front side of said detector assembly.

21. The flat panel X-ray detector according to claim 20 further comprising:
a layer of lightweight, elastic, compliant foam disposed immediately adjacent to the back side of said detector assembly.

22. The flat panel X-ray detector according to claim 12 wherein:
said core is comprised of a carbon foam;
said skins are comprised of carbon fiber composite; and
said rigid member is comprised of fiberglass epoxy plastic.

23. The flat panel X-ray detector according to claim 12 wherein:
said detector assembly comprises an indirect detector, and said detector glass is reduced in thickness to give it both greater X-ray transparency and a measure of flexibility compared to conventional detector glass;
and further comprising an X-ray transparent layer having a low-Z sandwich structure affixed to said thin detector glass for structural support.

24. The flat panel X-ray detector according to claim 12 further comprising:
detector assembly electronics disposed in said housing or outside said housing, wherein said electronics are outside of the path of said X-ray beam.

25. A flat panel X-ray detector comprising:
a housing having an opening through which said X-rays could pass through unimpeded;
a detector assembly disposed within said opening to receive said X-rays, said detector assembly comprising a detector glass layer,
and a scintillator layer disposed on said detector glass layer;
a front foam layer of lightweight, elastic, compliant foam disposed against said scintillator layer;
an X-ray transparent front layer having a low-Z sandwich structure, disposed against said front foam layer;
a back foam layer of lightweight, elastic, compliant foam disposed against said detector glass layer;
an X-ray transparent back layer having a low-Z sandwich structure, disposed against said back foam layer;
a front interface member connecting said front sandwich structure to said housing;
a back interface member connecting said back sandwich structure to said housing;
a glass mount member connecting said detector assembly to said housing;
wherein said low-Z sandwich structure comprises two thin skins, a low-volume-density transparent core disposed between said skins, and a rigid member disposed between said skins, surrounding the perimeter of said transparent core, and bonded to said skins for the purpose of resisting compressive loads;
wherein said core is comprised of a carbon foam;
wherein said skins are comprised of carbon fiber composite; and
wherein said rigid member is comprised of fiberglass epoxy plastic.

26. The flat panel X-ray detector according to claim 25 further comprising:
a thin layer of electrically conductive material bonded to one of the skin surfaces of said front sandwich layer, with said thin conductive layer in contact with said front interface member;
a thin layer of electrically conductive material bonded to one of the skin surfaces of said back sandwich layer, with said thin conductive layer in contact with said back interface member;
an electrically conductive gasket between one interface member and the corresponding sandwich layer;
wherein said housing is electrically conductive;
wherein the portions of said front and back interface members that are in contact with said electrically conductive thin layers and said housing are electrically conductive; resulting in said electrically conductive thin layers, said interface members and said housing forming an electrically continuous box that electrically shields components within said housing;
wherein said thin layers of electrically conductive material comprise foil, mesh, or plating,
wherein the electrically conductive portions of said front and back interface members are electrically conductive by means selected from the list consisting of:
a) said front and back interface members are comprised of electrically conductive metal, and
b) said front and back interface members are plastic with attached electrically conductive portions comprised of electrically conductive metal foil, mesh or plating.

27. The flat panel X-ray detector according to claim 26 wherein:
said thin layers of electrically conductive material comprise material selected from the list of materials consisting of aluminum, copper, and nickel;
said electrically conductive portions of front and back interface members comprise material selected from the list of materials consisting of aluminum, copper, and nickel.

28. The flat panel X-ray detector according to claim 25 further comprising:
detector assembly electronics disposed in said housing or outside said housing, wherein said electronics are outside of the path of said X-ray beam.

* * * * *